United States Patent
Lee et al.

(10) Patent No.: US 12,352,846 B2
(45) Date of Patent: Jul. 8, 2025

(54) SENSING INSTANCES FOR RADAR SENSING AND COMMUNICATION

(71) Applicant: QUALCOMM Incorporated, San Diego, CA (US)

(72) Inventors: Hyojin Lee, San Diego, CA (US); Weimin Duan, San Diego, CA (US); June Namgoong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 502 days.

(21) Appl. No.: 17/657,310

(22) Filed: Mar. 30, 2022

(65) Prior Publication Data
US 2023/0314591 A1    Oct. 5, 2023

(51) Int. Cl.
| | |
|---|---|
| *G01S 13/86* | (2006.01) |
| *G01S 13/22* | (2006.01) |
| *G01S 13/58* | (2006.01) |

(52) U.S. Cl.
CPC .......... *G01S 13/86* (2013.01); *G01S 13/225* (2013.01); *G01S 13/581* (2013.01)

(58) Field of Classification Search
CPC ........ G01S 7/006; G01S 13/765; G01S 13/86; G01S 7/0235; G01S 13/225; G01S 13/581; G01S 13/87; H04W 56/00
See application file for complete search history.

(56) References Cited

U.S. PATENT DOCUMENTS

| | | | |
|---|---|---|---|
| 2005/0212692 A1* | 9/2005 | Iny ........................ | G01S 13/765 |
| | | | 342/51 |
| 2011/0188414 A1 | 8/2011 | Dai et al. | |
| 2019/0173645 A1* | 6/2019 | Guo ....................... | H04L 5/0007 |
| 2019/0239172 A1* | 8/2019 | Hampel ............ | H04W 56/0065 |
| 2019/0293748 A1* | 9/2019 | Gulati ..................... | G01S 7/023 |
| 2019/0383925 A1* | 12/2019 | Gulati ................... | G01S 13/341 |
| 2021/0045074 A1* | 2/2021 | Manolakos ........... | H04L 5/0087 |
| 2021/0300344 A1* | 9/2021 | Anvari ................... | G08G 1/161 |
| 2022/0022056 A1* | 1/2022 | Park ........................ | G01S 7/006 |
| 2022/0038153 A1* | 2/2022 | Guo ....................... | H04L 5/0035 |
| 2022/0104178 A1* | 3/2022 | Lee ...................... | H04W 64/006 |
| 2022/0107384 A1* | 4/2022 | Duan .................. | H04B 7/0695 |

(Continued)

FOREIGN PATENT DOCUMENTS

CN    104898095 B    4/2017

OTHER PUBLICATIONS

International Search Report and Written Opinion—PCT/US2023/061930—ISA/EPO—Jun. 5, 2023.

(Continued)

*Primary Examiner* — Peter M Bythrow
(74) *Attorney, Agent, or Firm* — Patterson + Sheridan, L.L.P.\Qualcomm

(57) ABSTRACT

Certain aspects of the present disclosure provide techniques for joint communication and radar sensing. A method is provided for wireless communications by a network entity. The method generally includes communicating one or more radar signals in a first set of slots. Each of the first set of slots comprises an extended cyclic prefix have a first length. The method generally includes communicating one or more signals in a second set of slots, each of the second set of slots comprising a normal cyclic prefix having a second length that is shorter than the first length.

30 Claims, 11 Drawing Sheets

(56) References Cited

U.S. PATENT DOCUMENTS

| | | | |
|---|---|---|---|
| 2022/0113400 A1* | 4/2022 | Manolakos | G01S 7/006 |
| 2022/0232549 A1* | 7/2022 | Yeo | H04L 5/0044 |
| 2022/0256519 A1* | 8/2022 | Jeon | G01S 7/0235 |
| 2022/0295237 A1* | 9/2022 | Zhang | H04W 4/08 |
| 2022/0330198 A1* | 10/2022 | Ren | H04W 64/00 |
| 2022/0365167 A1* | 11/2022 | Zhang | G01S 13/931 |
| 2022/0417871 A1* | 12/2022 | Wang | H04L 25/0226 |
| 2023/0043235 A1* | 2/2023 | Kumari | H04B 7/0617 |
| 2023/0199741 A1* | 6/2023 | Kumari | G01S 7/0234 |
| | | | 370/329 |
| 2023/0309132 A1* | 9/2023 | Duan | G01S 7/006 |

OTHER PUBLICATIONS

Wang Y., et al., "CP-Based OFDM Radar-Communications Signal Using Interval Linear Phase Compression Modulation", The Journal of Engineering, The Institution of Engineering and Technology, Michael Faraday House, Six Hills Way, Stevenage, Herts. SG1 2AY, UK, vol. 2019, No. 21, Nov. 1, 2019, pp. 7902-7906, XP006086809, DOI: 10.1049/JOE.2019.0768, p. 7903, 7902, Line 1, Paragraph 2.

\* cited by examiner

SENSING INSTANCES FOR RADAR SENSING AND COMMUNICATION

INTRODUCTION

Field of the Disclosure

Aspects of the present disclosure relate to wireless communications, and more particularly, to techniques for radar sensing.

DESCRIPTION OF RELATED ART

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communication by a network entity. The method includes communicating one or more radar signals in a first set of slots. Each of the first set of slots comprises an extended cyclic prefix have a first length. The method includes communicating one or more signals in a second set of slots, each of the second set of slots comprising a normal cyclic prefix having a second length that is shorter than the first length.

Other aspects provide: an apparatus operable, configured, or otherwise adapted to perform the aforementioned methods as well as those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Figure 1:
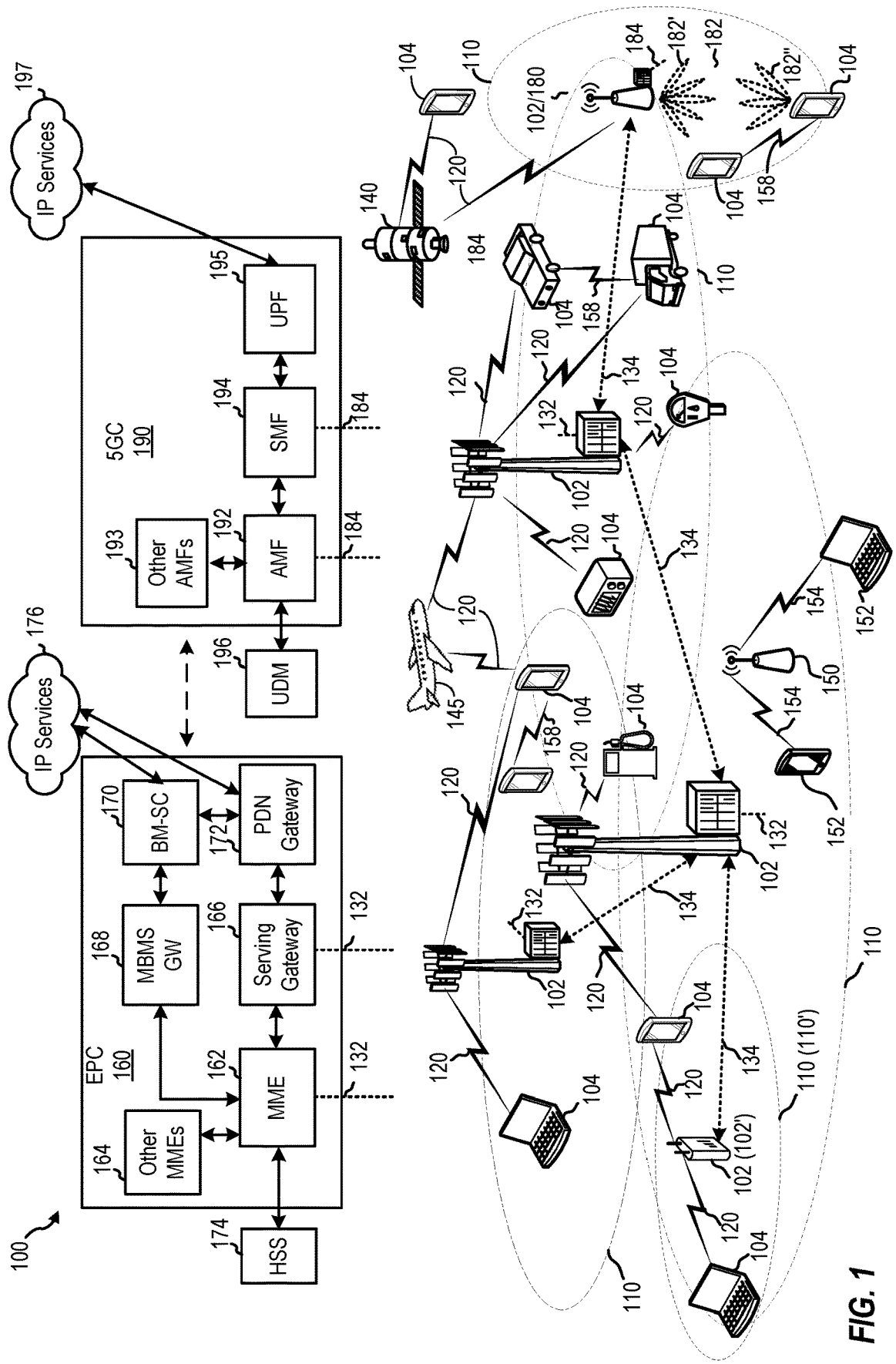
FIG. 1 depicts an example wireless communications network.

Aspects of the present disclosure provide apparatuses, methods, processing systems, and computer-readable mediums for sensing instances for joint communication and radar sensing.

Radar sensing is way of estimating distance and/or velocity of objects relative to a radar sensing device. Radar sensing involves the sending of probing signals to targets and inferring useful information from the target echoes (e.g., reflections of the probing signals off the targets). With cooperative radar sensing, two or more devices exchange information and cooperate to perform joint radar sensing over a wider area. Further, cooperative radar sensing may be used to triangulate a position of an object to more accurately determine its position/location. The devices configured to perform radar sensing may be referred to herein as radar sensing entities. Examples of radar sensing entities include base stations and/or user equipments.

A radar server allocates time, frequency, and/or spatial radio resources to the cooperating radar sensing devices for sending and/or receiving of radar signals. The time resources allocated for the sensing and/or receiving of radar signals may be referred to herein as sensing instances. In addition, the radar server allocates time, frequency, and/or spatial radio resources for the radar sensing devices to use for communication, other than radar sensing, such as for sending and receiving control information and/or data traffic. The time resource allocated for communication, other than radar sensing, may be referred to herein as "normal" slots.

The radar sensing devices transmit radar signals using the allocated radio resources and receive reflections of the radar signals. The radar sensing devices derive sensing information from the transmission and reception of the radar signals, such as the distance and velocity of the targets, and provide the sensing information to the radar server. The radar server collects the information of the cooperating radar sensing devices and generates final cooperative sensing information based on the sensing information collected from the multiple cooperating radar sensing devices.

Aspects of the present disclosure provide for configuring resources for joint radar sensing and communication.

In some examples, a radar server allocates the radio resources configuring radar sensing entities with radar sensing periods. Each radar sensing period may include a sensing instance and one or more normal slots. A radar sensing instance may include contiguous slots or non-contiguous slots configured for radar sensing (e.g., transmitting and/or receiving radar signals).

In some examples, radar sensing entities transmit radar signals in radar sensing instances with extended cyclic prefix (CP) to enhance coverage of the radar sensing. As discussed in more detail below, use an extended CP increases the maximum sensing distance of the radar sensing. Thus, with extended CP, a radar sensing entity may detect objects at a greater distance from the radar sensing entity. Outside of the radar sensing instances, the radar sensing entities may communicate in slots configured with a normal CP. Communicating with the normal CP may allow more available resources for data communication during the normal slots in which the enhanced coverage provided by use of the extended CP may not be needed.

In some examples, the radar signals may be dedicated radar reference signals (RRSs). A dedicated RRS refers to a reference signal that is used for the purposes of radar sensing. Use of a dedicated RRS may allow the RRS to be tailored for radar sensing. The radar sensing device may also transmit non-radar dedicated reference signals that may be reused for the radar sensing. A non-radar dedicated RS refers to an RS that is not dedicated for radar sensing. One example of a non-radar dedicated reference signal that may be reused for radar sensing is the positioning reference signal (PRS). Use of a non-dedicated radar RS for radar sensing may allow current RS designs to be leveraged for radar sensing.

In some examples, radar signals transmitted in a sensing instance are quasi-colocated (QCL'd) with respect to Doppler shift, Doppler spread, average delay, and/or delay spread for phase continuous radar signaling to ensure phase coherency between radar signals.

In some examples, the radar signals are configured across multiple intra-band component carriers (CCs) to improve range detection of the radar sensing.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
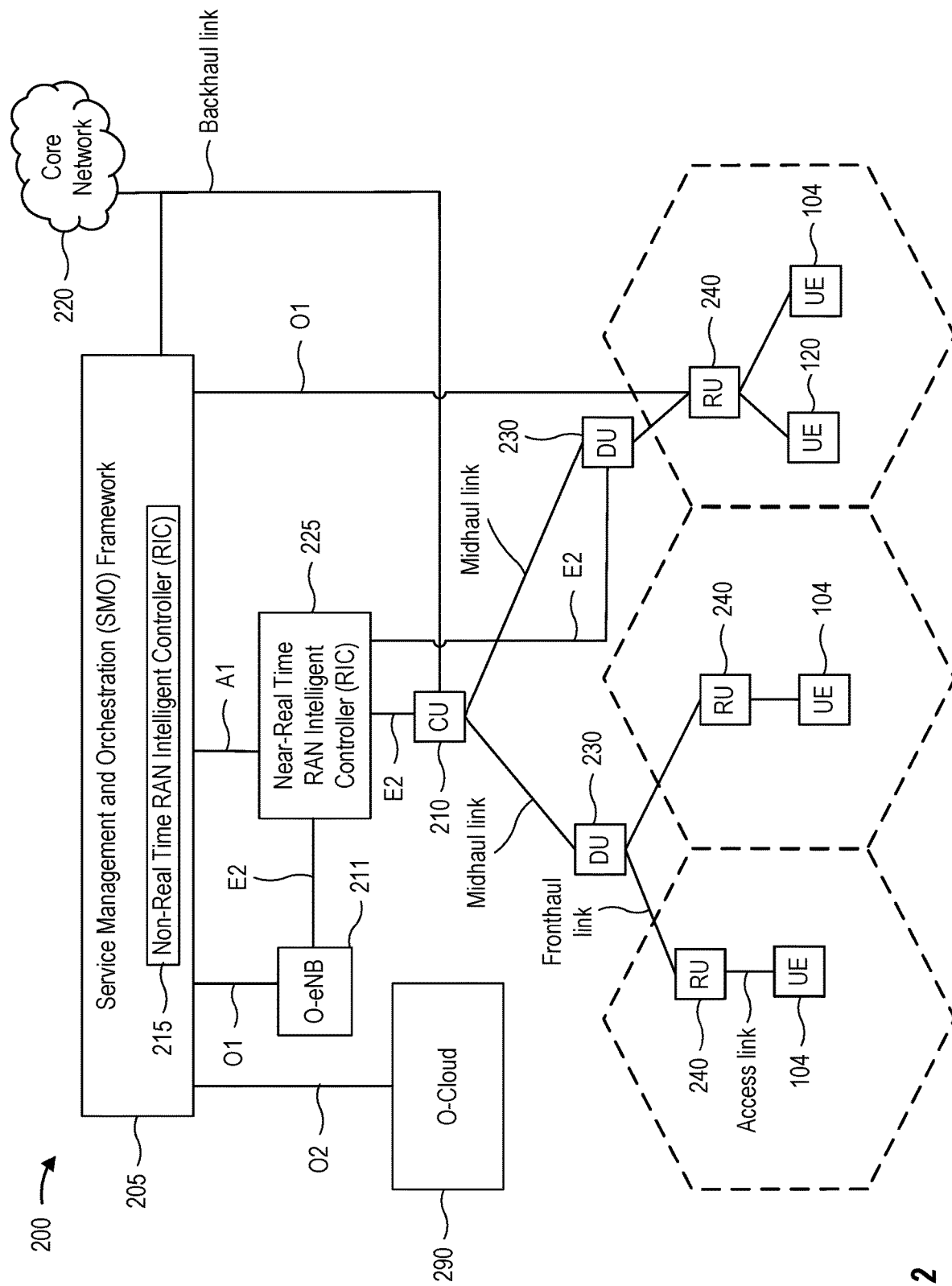
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182".

BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (MC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit—User Plane (CU-UP)), control plane functionality (e.g., Central Unit—Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via 01) or via creation of RAN management policies (such as A1 policies).

Figure 3:
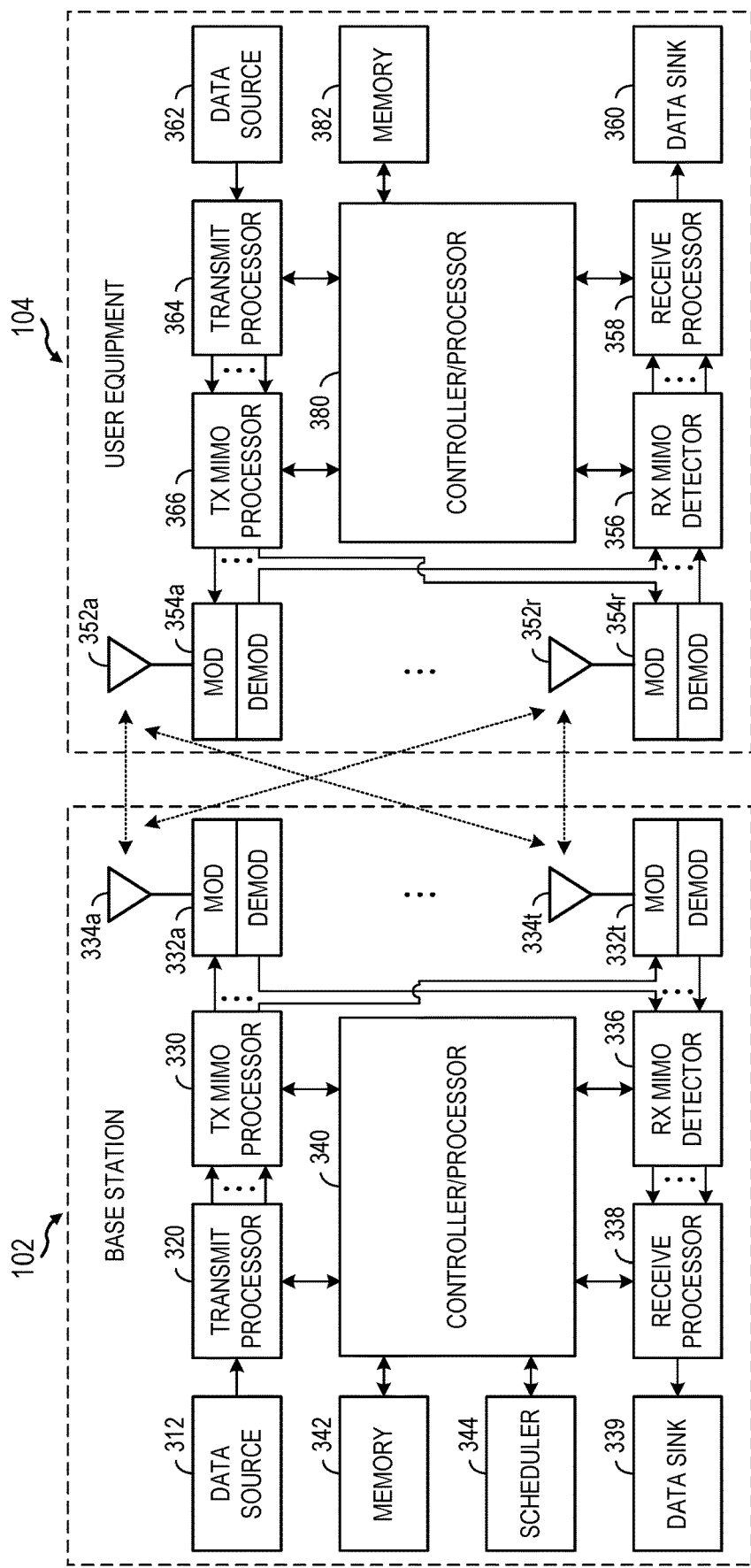
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical hybrid automatic repeat request (HARD) indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the physical uplink shared channel (PUSCH)) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, transmit (TX) MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, receive (RX) MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figure 4:
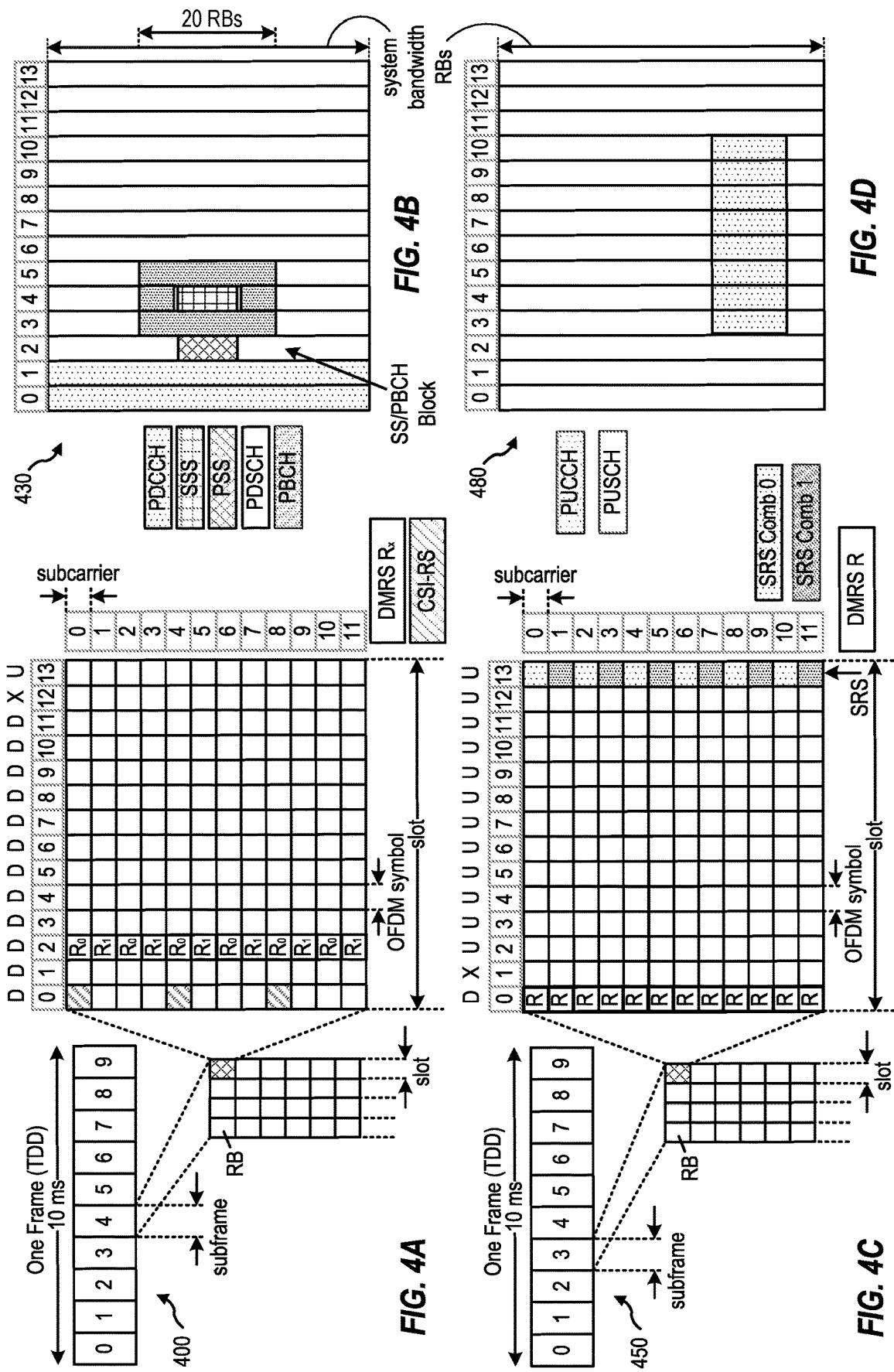
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ acknowledgment/negative acknowledgment (ACK/NACK) feedback. The PUSCH carries data, and may additionally be used to carry a buffer status report (BSR), a power headroom report (PHR), and/or UCI.

Aspects Related to Sensing Instances for Radar Sensing and Communications

As discussed above, radar sensing is way of estimating distance and/or velocity of objects and with cooperative radar sensing, two or more devices exchange information and perform radar sensing. The devices can also perform communications, such as the transmitting and receiving of control and/or data traffic, in addition to the radar sensing.

Figure 5:
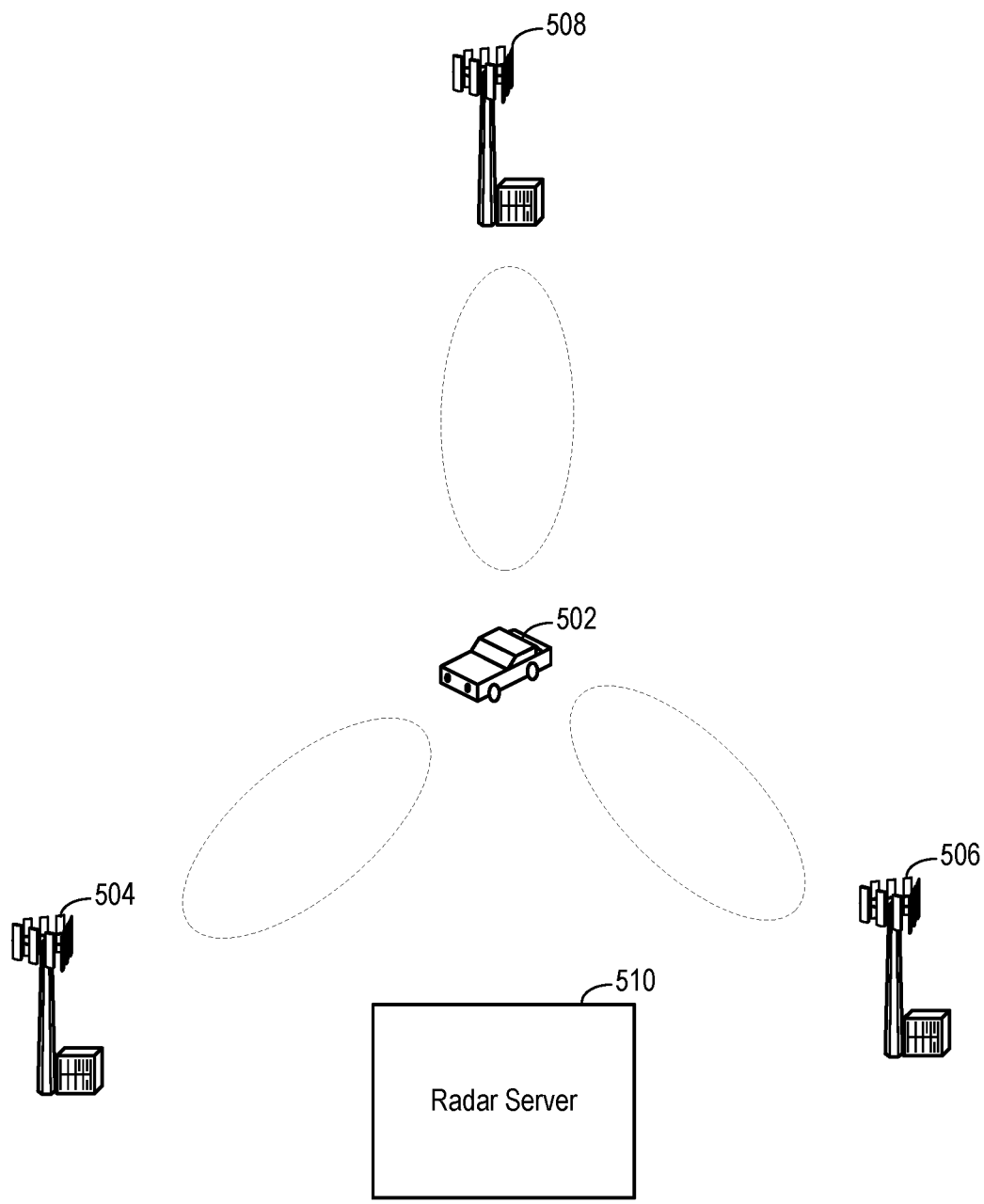
FIG. 5 depicts example cooperative radar sensing.

FIG. 5 depicts example cooperative radar sensing. In the example shown in FIG. 5, radar sensing entity 504, radar sensing entity 506, radar sensing entity 508, and radar server 510 are configured to perform cooperative radar sensing of a target 502. Target 502 may be an example of a UE 104 in wireless communications network 100 illustrated in FIGS. 1-3. Radar sensing entities 504, 506, and 508 may be network entities. In some examples, radar sensing entities 504, 506, and 508 are an example of BSs 102 in wireless communications network 100 illustrated in FIGS. 1-3. In some examples, a radar server may also be one of the cooperative radar sensing entities.

Although BSs are shown in FIG. 5, a UE (e.g., such as UE 104 in wireless communications network 100 illustrated in FIGS. 1-3) may also be a cooperating radar sensing entity. Further, it should be understood that while FIG. 5 depicts three entities performing cooperative radar sensing, this is merely one illustrative example, and fewer than three or more than three entities may perform cooperative radar sensing. Further, it should be understood that while FIG. 5 depicts cooperative radar sensing of one target, this is merely one illustrative example, and cooperative radar sensing may be performed for more than one target.

Figure 6:
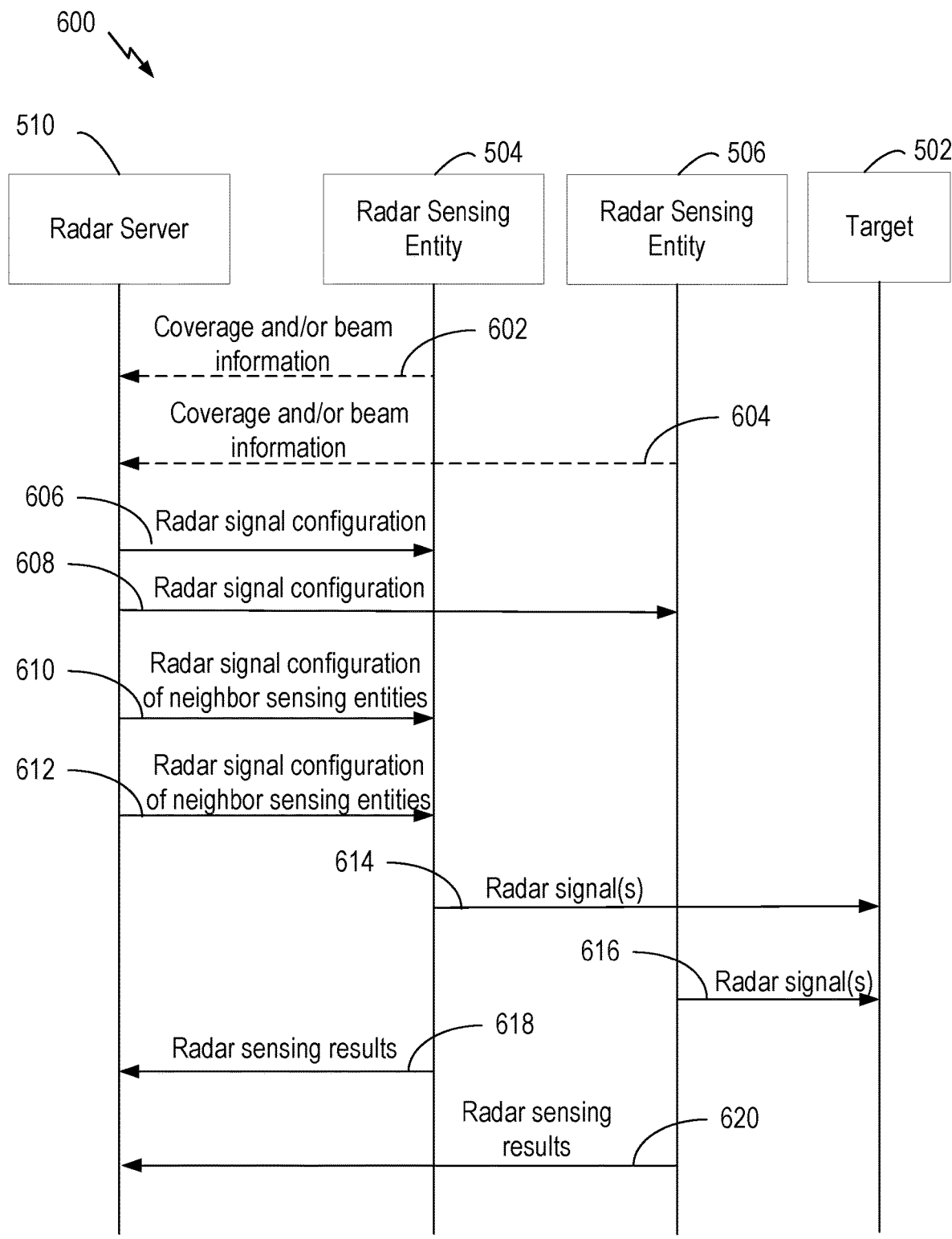
FIG. 6 depicts a process flow for communications in a network between a radar server and cooperative radar sensing entities.

FIG. 6 depicts a process flow 600 for communications in a network between radar server 510 and the cooperating radar sensing entities. Process flow 600 depicts the communications between radar server 510, radar sensing entity 504, and radar sensing entity 506. It is noted that radar sensing entity 508 is not shown in FIG. 6 for simplicity, however, it should be understood that similar communications are performed with radar sensing entity 508 as those shown for radar sensing entity 504 and 506.

In order to allocate radio resources for the radar signaling, radar server 510 has coverage and beam information of each of the cooperating radar sensing entities, radar sensing entities 504 and 506. The coverage information may include the transmit power and/or the effective isotropic radiated power (EIRP) available at the cooperating radar sensing devices. The beam information may include the number of beams and/or the beam directions available at the cooperating radar sensing devices.

In some examples, the coverage and/or beam information is stored at the radar server 510 when the radar server 510 is deployed. In some examples, the coverage and/or beam information is signaled to the radar server 510 by the respective cooperating radar sensing entities 504 and 506, at 602 and 604, respectively, as shown in FIG. 6. In some examples, a portion of the beam and/or coverage information is stored at the radar server 510 when the radar server 510 is deployed and a portion of the beam and/or coverage information is signaled to the radar server 510 by the cooperating radar sensing entities 504 and 506. The beam and/or coverage information may be signaled by the cooperating radar sensing entities 504 and 506 to radar server 510 periodically or on-demand.

It is noted that while FIG. 6 depicts the coverage and/or beam information from radar sensing entity 506 being signaled at 604 after the coverage and/or beam information from radar sensing entity 504 at 602, it should be understood that the coverage and/or beam information from radar sensing entity 506 at 604 may be signaled at the same time or before the coverage and/or beam information from radar sensing entity 504 at 602.

Radar server 510 uses the beam and/or coverage information to determine time, frequency, and/or spatial radio resources for the cooperating radar sensing entities 504 and 506. The spatial resources may include beam scanning directions for radar signal transmission.

Radar server 510 provides a radar signal configuration to the cooperating radar sensing entities to provide the respective radio resource allocations to the respective radar sensing entities to use for radar signaling. As shown in FIG. 6, radar server 510 provides a radar signal configuration to radar sensing entity 504 at 606 and provides a radar signal configuration to radar sensing entity 506 at 608. The radio resource allocations may also be used by the radar sensing entities for non-radar sensing communications.

Radar sensing parameters may include a range resolution ($\Delta d$), a maximum range ($d_{max}$), a velocity resolution ($\Delta v$), a maximum velocity ($v_{max}$), and an effective velocity range ($v_{eff}=2v_{max}$). In some examples, radar signal parameters are configured. The radar signal parameters may include a subcarrier spacing ($\Delta f$). The minimum SCS may be about ten times a maximum Doppler frequency, where $\Delta f=20\ v_{max}\ f_c/c$ giving $v_{max}<c\ \Delta f/20\ f_c$. The radar signal parameters may include a guard interval or cyclic prefix length ($T_g$). The guard interval or CP is for a time interval until the latest radar echo is received, $T_g>d_{max}/c$ giving $d_{max}<c\ T_g/2$. The radar signal parameters may include a bandwidth (W) of the radar signal, where $W>c/(2\Delta d)$ giving $\Delta d>c/(2\ W)$. The radar signal parameters may include a burst duration ($T_B$) of the radar signal, where $T_B>c/(2\ f_c\ \Delta v)$ giving $\Delta v>c/(2\ f_c\ T_B)$. The radar signal parameters may include a time domain spacing ($T_S$) between consecutive radar signals, where $T_S<c/(2\ f_c\ v_{eff})$ giving $v_{eff}<c/(2\ f_c\ T_S)$. The radar signal parameters may include a frequency domain spacing ($f_S$) between consecutive radar signals, where $f_S<c/(2\ d_{max})$ giving $d_{max}<c/(2\ f_S)$.

According to certain aspects, the radar signals include radar dedicated RRSs and/or non-radar dedicated reference signals reused for radar sensing. As mentioned above, in one example, PRS may be reused for radar sensing. In 5G NR systems, PRS is flexible in time and frequency. The PRS bandwidth may be between 24 PRBs and 272 PRBs. The resource elements (REs) in which PRS is transmitted may be staggered in the frequency-domain. A PRS may be configured for repetition in a set of consecutive slots (e.g., with a repetition factor N=1, 2, 4, 6, 8, 16, 32) and with a time gap specifying a number of slots (e.g., G=1, 2, 4, 6, 8, 16, 32 slots) between each repetition of the PRS. PRS may be used for multiple radar sensing purposes. For example, PRS with a wider bandwidth and a shorter duration may be used for range detection and PRS with a narrower bandwidth and a longer duration may be used for velocity detection.

PRS, however, may have some limitations for radar sensing. For example, PRS may not have phase continuity between PRS repetitions within a sensing instance, which may limit the accuracy of velocity detection. Further, PRS may have limited sensing coverage. In an example, where $f_c=3.5$ GHz, $\Delta f=30$ GHz, W=100 MHz, and $T_B=16$ ms, to satisfy $d_{max}<c\ T_g/2$, $d_{max}<351$ m. In an example, where $f_c=13$ GHz, $\Delta f=120$ GHz, W=400 MHz, and $T_B=16$ ms, to satisfy $d_{max}<c\ T_g/2$, $d_{max}=87.9$ m. Thus, the range of PRS ($d_{max}$) may be limited due to its CP length ($T_g$).

Also, to satisfy $\Delta d>c/(2\ W)$, $\Delta d>0.38$ m and 1.5 m, respectively. Thus, the range resolution ($\Delta d$) of the PRS may also be limited due to the PRS bandwidth (W). Accordingly, PRS spanning intra-band CCs is desirable to provide a larger bandwidth to improve the range resolution for better range detection.

Further in the two examples above, to satisfy $\Delta v>c/(2\ f_c\ T_B)$, $\Delta v>2.6$ km/h and 9.6 km/h, respectively, and to satisfy $v_{max}<c\ \Delta f/20\ f_c$, $v_{max}<463$ km/h and 498 km/h, respectively.

Thus, the velocity resolution with the PRS may be 2.6 km/h to 9.6 km/h and the maximum sensed velocity may be 463 km/h to 498 km/h.

Figure 7:
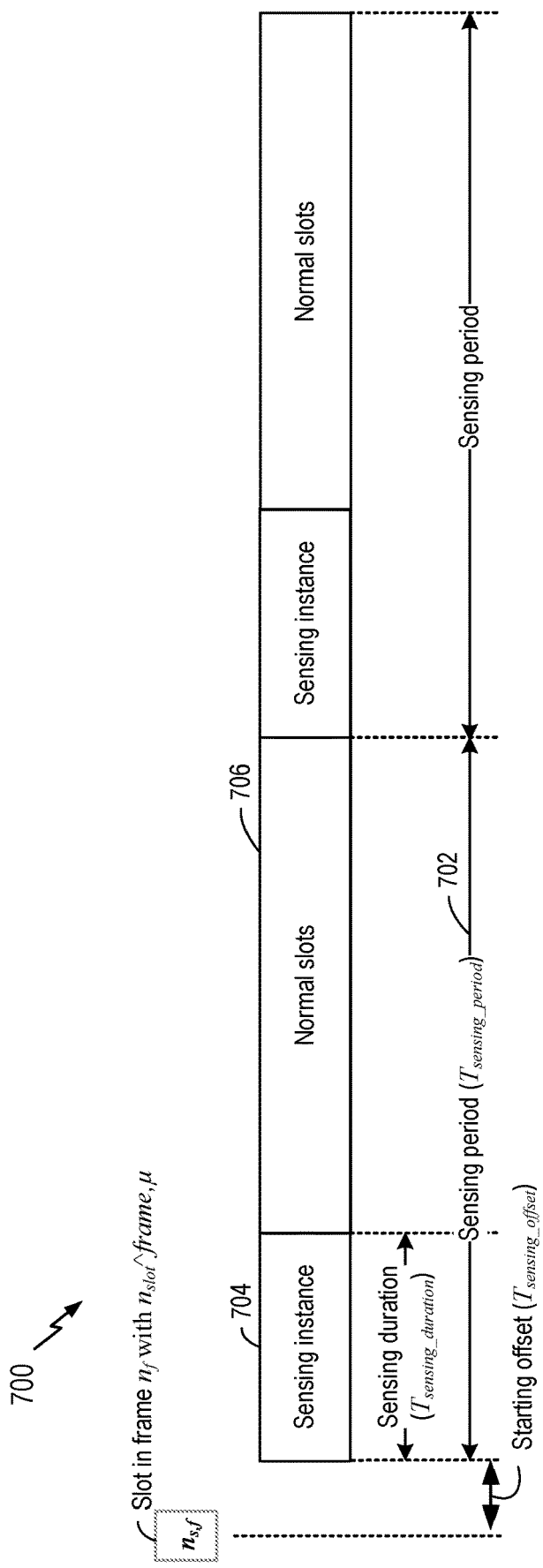
FIG. 7 depicts an example radar sensing configuration with contiguous radar sensing slots.

FIG. 7 depicts an example radar sensing configuration 700 with contiguous radar sensing slots. The radar sensing configuration 700 may be an example of a radar signal configuration provided by radar server 510 to radar sensing entities 504 and 506 at 606 and 608, respectively, in the process flow 600 illustrated in FIG. 6. As shown, radar sensing configuration 700 include sensing periods. A sensing period 702 has a time duration $T_{period}^{sensing}$. The sensing period 702 has a starting time offset (e.g., from a starting slot within a subframe) $T_{offset}^{sensing}$. The time duration and starting time offset for the sensing period 702 may be specified in terms of number of slots.

A sensing period 702 includes a sensing instance 704. The sensing instance 704 includes one or more contiguous slots for transmitting and/or receiving radar signal(s). For example, a radar sensing entity may transmit one or more radar signals during a sensing instance 704 and/or monitor/receive one or more radar signals during the duration instance 704. The sensing instance 704 has a time duration $T_{duration}^{sensing}$. The duration of the sensing instance 704 may be specified in terms of number of slots.

The sensing period 702 includes a set of normal slots 706 in which communications can be performed. For example, in the set of normal slots 706, the radar sensing entities can perform non-radar signal communications, such as uplink, downlink, sidelink, control and/or data traffic communications.

The radar sensing configuration 700 may be given by:

$$(N_{slot}^{frame,\mu}n_f+n_{s,f}^{\mu}-T_{offset}^{sensing}) \mod T_{period}^{sensing} < T_{duration}^{sensing} \quad \text{Eq. 1}$$

In Eq. 1, $N_{slot}^{frame,\mu}$ is a number of slots within a frame for a given numerology (e.g., SCS) $\mu$, $n_f$ is a system frame number, and $n_{s,f}^{\mu}$ is a slot number within a frame for SCS $\mu$.

Figure 8:
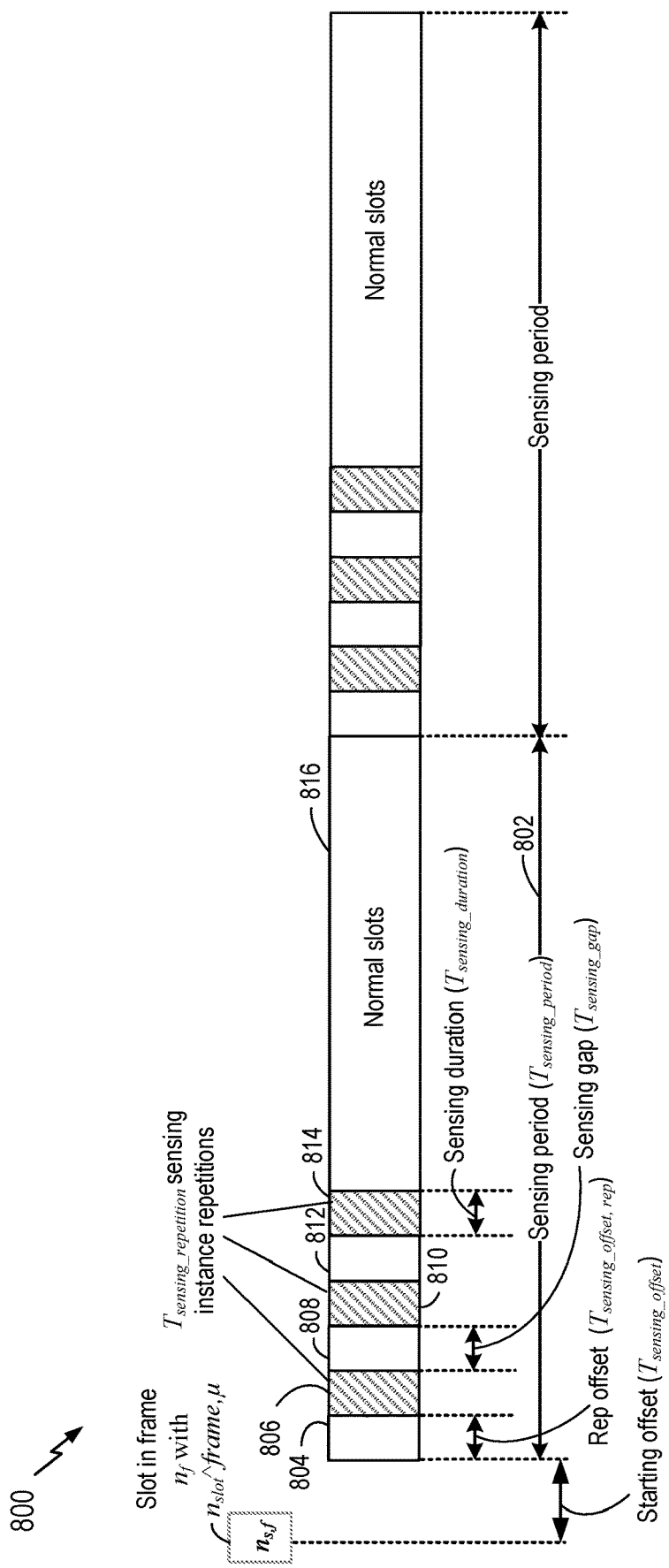
FIG. 8 depicts an example radar sensing configuration with non-contiguous radar sensing slots.

FIG. 8 depicts an example radar sensing configuration with non-contiguous radar sensing slots. The radar sensing configuration 800 may be an example of a radar signal configuration provided by radar server 510 to radar sensing entities 504 and 506 at 606 and 608, respectively, in the process flow 600 illustrated in FIG. 6. As shown, radar sensing configuration 800 include sensing periods. A sensing period 802 has a time duration $T_{period}^{sensing}$. The sensing period 802 has a starting time offset $T_{offset}^{sensing}$. The time duration and starting time offset for the sensing period 802 may be specified in terms of number of slots.

A sensing period 802 includes non-contiguous sensing instance repetitions 806, 810, and 814 for transmitting and receiving radar signal(s). For example, a radar sensing entity may transmit one or more radar signals during the sensing instance repetitions 806, 810, and 814 and/or monitor/receive one or more radar signals during the sensing instances 806, 810, and 814. Each of the sensing instance repetitions 806, 810, and 814 has a time duration $T_{duration}^{sensing}$. The duration of the sensing instances 806, 810, and 814 may be specified in terms of number of slots. The sensing instance repetitions 806, 810, and 814 can be specified by the $T_{duration}^{sensing}$, a number of sensing instance repetitions (in the illustrated example, three) within a sensing period $T_{repetition}^{sensing}$, a time gap duration between sensing instance repetitions $T_{gap}^{sensing}$, and a starting sensing instance repetition offset $T_{offset,rep}^{sensing}$.

It should be understood that although FIG. 8 illustrates three non-contiguous sensing instance repetitions (e.g., $T_{repetition}^{sensing}=3$) in the sensing period, a sensing period may include fewer or more than three non-contiguous sensing instance repetitions.

The sensing period 802 includes a set of normal slots 804, 808, 812, and 816 in which communications can be performed. For example, in the set of normal slots 804, 808, 812, and 816, the radar sensing entities can perform non-radar signal communications, such as uplink, downlink, sidelink, control and/or data traffic communications.

The radar sensing configuration 800 may be given by:

$$(N_{slot}^{frame,\mu}n_f+n_{s,f}^{\mu}-T_{offset}^{sensing}-T_{offset,rep}^{sensing}) \mod T_{period}^{sensing} \in \{iT_{gap}^{sensing}+j\} \quad \text{for} \quad i=0,\ldots,T_{repetition}^{sensing} \text{ and } j=0,\ldots,T_{duration}^{sensing} \quad \text{Eq. 2}$$

Accordingly, radar server 510 may provide the parameters of the Eq. 1 and/or the parameters of the Eq. 2 in the radar signal configuration to the cooperating radar sensing entities 504 and 506 at 606 and 608, respectively, in the process flow 600 illustrated in FIG. 6.

According to certain aspects, the sensing instances (e.g., 704, 806, 810, 814) may be configured with extended CP regardless of the SCS (4$j$) configured for the frame (e.g., the frame $n_f$). The extended CP may increase the range of the radar sensing (e.g., due to a larger value of $T_g$ in $d_{max} < c \cdot T_g/2$). For example, the sensing instance slots may use a CP of $512\kappa \cdot 2^{-\mu}$. A normal CP may be used in the normal slots (e.g., 706, 804, 808, 812, 816). For example, the normal slots may use a CP of $144\kappa \cdot 2^{-\mu}$. In some examples, $\kappa=64$, $\mu=0, 1, 2, 3, 4$, and $\Delta f=2^{\mu} \cdot 15$ kHz, giving 15, 30, 60, 120, and 240 kHz for the values of $\mu$ respectively.

Accordingly, radar server 510 may provide an indication of which slots to use an extended CP and which slots to use a normal CP in the radar signal configuration to the cooperating radar sensing entities 504 and 506 at 606 and 608, respectively, in the process flow 600 illustrated in FIG. 6.

According to certain aspects, the radar signals are transmitted in different CCs within the same frequency band (i.e., intra-band CCs). The intra-band radar signals can be used jointly to derive radar sensing information. In some examples, a radar sensing entity transmits one or more radar signals in a first CC and one or more radar signals in a second CC within the same frequency band as the first CC. In some examples, a first radar sensing entity transmits one or more radar signals in a first CC and a second radar sensing entity transmits one or more radar signals in a second CC within the same frequency band as the first CC. Accordingly, a radar sensing entity may receive radar signals on the first CC and/or the second CC. Further, a radar sensing entity, or different radar sensing entities, may transmit radar signals on more than two different CCs.

According to certain aspects, the radar signals transmitted in intra-band CCs are QCL'd. QCL'd signals may refer to signals transmitted from different antenna ports that experience radio channels having common properties. In some examples, the intra-band CCs may be QCL'd with respect to at least average delay and delay spread (e.g., QCL-Type C).

Accordingly, radar server 510 may indicate the intra-band CCs and the associated radar signals in the radar signal configuration to the cooperating radar sensing entities 504 and 506 at 606 and 608, respectively, in the process flow 600 illustrated in FIG. 6.

Returning to FIG. 6, it is noted that while FIG. 6 depicts the radar signal configuration being signaled to radar sensing entity 506 at 608 after the radar signal configuration to radar sensing entity 504 at 606, it should be understood that the radar signal configuration signaled to radar sensing entity 506 at 608 may be signaled at the same time or before the radar signal configuration to radar sensing entity 504 at 606.

Radar server 510 may also provide the radar sensing entities 504 and 506 with the radar signal configurations of neighboring radar sensing entities. For example, radar server 510 may provide each of the radar sensing entities 504, 506, and 508 with the radar signal configurations of each of the other radar sensing entities 504, 506, and 508. As shown in FIG. 6, radar server 510 provides the radar signal configurations of the neighbor sensing entities to radar sensing entity 504 at 610 and provides the radar signal configurations of neighbor sensing entities to radar sensing entity 506 at 612. The radio signal configurations of the neighbor sensing entities may be useful in cases where the radar sensing entities are configured for bistatic radar or multi-static radar. In bistatic and multi-static radar, an entity that receives a reflected radar signal is a different entity than the entity that transmitted the radar signal. In monostatic radar, the transmitter and receiver are colocated.

It is noted that while FIG. 6 depicts the radar signal configurations of neighboring sensing entities being signaled to radar sensing entity 506 at 612 after the radar signal configurations of neighboring sensor entities to radar sensing entity 504 at 610, it should be understood that the radar signal configurations of neighboring sensor entities may be signaled to radar sensing entity 506 at 612 at the same time or before the radar signal configurations of neighboring sensor entities to radar sensing entity 504 at 610. Further, while the radar sensing configurations for the cooperating radar sensing entities 504 and 506 are shown as signaled to the cooperating radar sensing entities separately from the radar sensing configurations of neighboring sensor entities, the radar sensing configurations of neighboring sensor entities at 610 and 612 may be signaled together with the radar sensing configurations for the cooperating radar sensing entities 504 and 506, at 606 and 608, respectively.

The cooperative radar sensing entities can then transmit radar sensing signals using the allocations received from radar server 510. As shown in FIG. 6, radar sensing entity 504 transmits one or more radar signal(s) at 614 and radar sensing entity 506 transmits one or more radar signal(s) at 616. The radar signals may be directed at target 502. Although not shown, the radar sensing entities may also perform communications simultaneously with the radar sensing.

Figure 9:
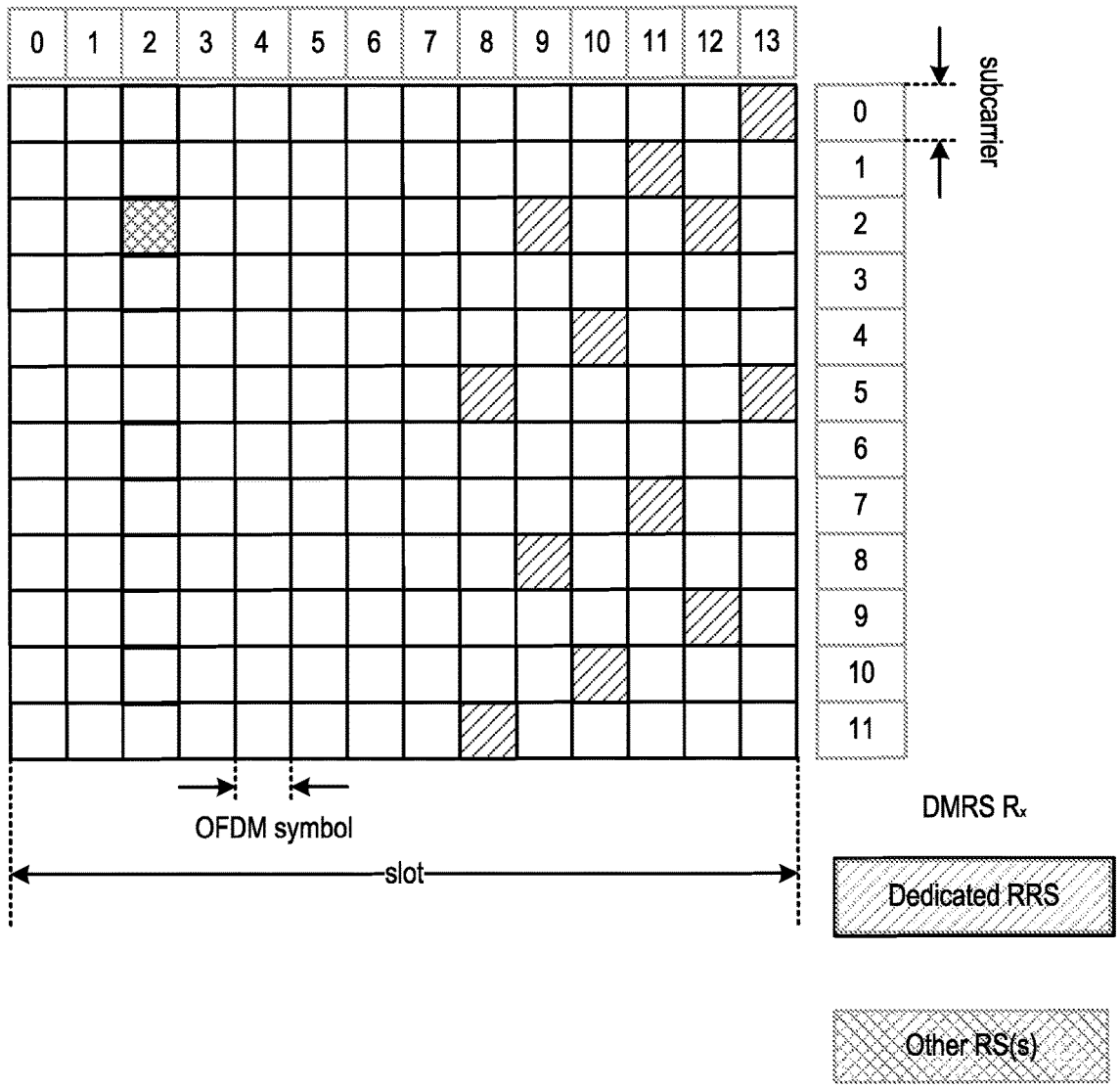
FIG. 9 depicts example radar dedicated reference signals and non-radar dedicated reference signal transmission in a slot.

FIG. 9 depicts example radar signals transmitted with a slot 900. The sensing instance includes at least one radar dedicated reference signal, which may be referred to as a radar reference signal (RRS). The sensing instance may also include one or more non-radar dedicated reference signals, such as one or more PRSs, one or more tracking reference signals (TRSs), and/or one or more CSI-RS that may also be used for the radar sensing.

The radar sensing entities are not expected to receive any radar signals with an abnormal phase jump during a sensing instance. According to certain aspects, the radar signals are phase coherent. For example, to ensure phase coherency, the radar signals transmitted within a sensing instance are QCL'd so that the radar signals are phase continuous. With phase continuous transmission, the radar signals transmitted on different frequencies do not show phase discontinuity. The radar signals may be QCL'd with respect to Doppler shift, Doppler spread, average delay, and delay spread (e.g., referred to as QCL-TypeA). Phase continuity improves spectral efficiency.

It should be understood that while FIG. 9 illustrates one example of radar signals transmitted within a slot 900, the radar signals may be transmitted with various different patterns within a slot. According to certain aspects, the transmission of more radar signals within the slot may provide improved positioning accuracy, but increased overhead, while transmission of fewer radar signals within the slot provides less positioning accuracy and decreased overhead.

It is noted that while FIG. 6 depicts the radar signals from radar sensing entity 506 at 616 being transmitted after the radar signals from radar sensing entity 504 at 614, it should be understood that the radar signals from radar sensing entity 506 at 616 may be transmitted at the same time or before the radar signals from radar sensing entity 504 at 614.

The radar sensing entity 504 and 506 monitor and receive reflections of the radar sensing signals. As discussed above, in bistatic or multi-static radar, radar sensing entity 506 may receive a radar signal transmitted by radar sensing entity 504 that was reflected by target 502. Similarly, radar sensing entity 504 may receive a radar signal transmitted by radar sensing entity 506 that was reflected by target 502. Additionally or alternatively, radar sensing entity 504 may receive a radar signal transmitted by radar sensing entity 504 and reflected by target 502 and radar sensing entity 506 may receive a radar signal transmitted by radar sensing entity 506 and reflected by target 502.

The radar sensing entities 504 and 506 may derive radar sensing information based on the received reflected radar signal(s). For example, radar sensing information may include the distance and/or the velocity of target 502. The radar sensing entities 504 and 506 may derive the distance of target 502 based on a delay between when a radar signal was transmitted and when a reflection of the radar signal was received. The radar sensing entities 504 and 506 may derive the velocity of target 502 based on Doppler information of the received reflected radar signals from target 502. Additionally or alternatively, radar sensing entities 504 and 506 may provide the delay and/or Doppler information to radar server 510.

As shown in FIG. 6, radar sensing entity 504 transmits radar sensing information to radar server 510 at 618 and radar sensing entity 506 transmits radar sensing information to radar server 510 at 620. The radar sensing information may be transmitted to radar server 510 in a radar sensing report.

It is noted that while FIG. 6 depicts the radar sensing information from radar sensing entity 506 being transmitted at 620 after the radar sensing information from radar sensing entity 504 at 618, it should be understood that the radar sensing information from radar sensing entity 506 at 620 may be transmitted at the same time or before the radar sensing information from radar sensing entity 504 at 618.

Radar server 510 collects the radar sensing information of the cooperating radar sensing devices and generates final cooperative sensing information based on the sensing information collected from the multiple cooperating radar sensing devices. In some examples, the final cooperative sensing information may be used in managing interference in the system. In some examples, the final cooperative sensing information may be used for coordinating the beams used by the radar sensing entities. In some examples, radar server 510 provides the radar sensing information and/or the final cooperative sensing information to another entity which uses the information.

Example Operations of a Radar Entity

Figure 10:
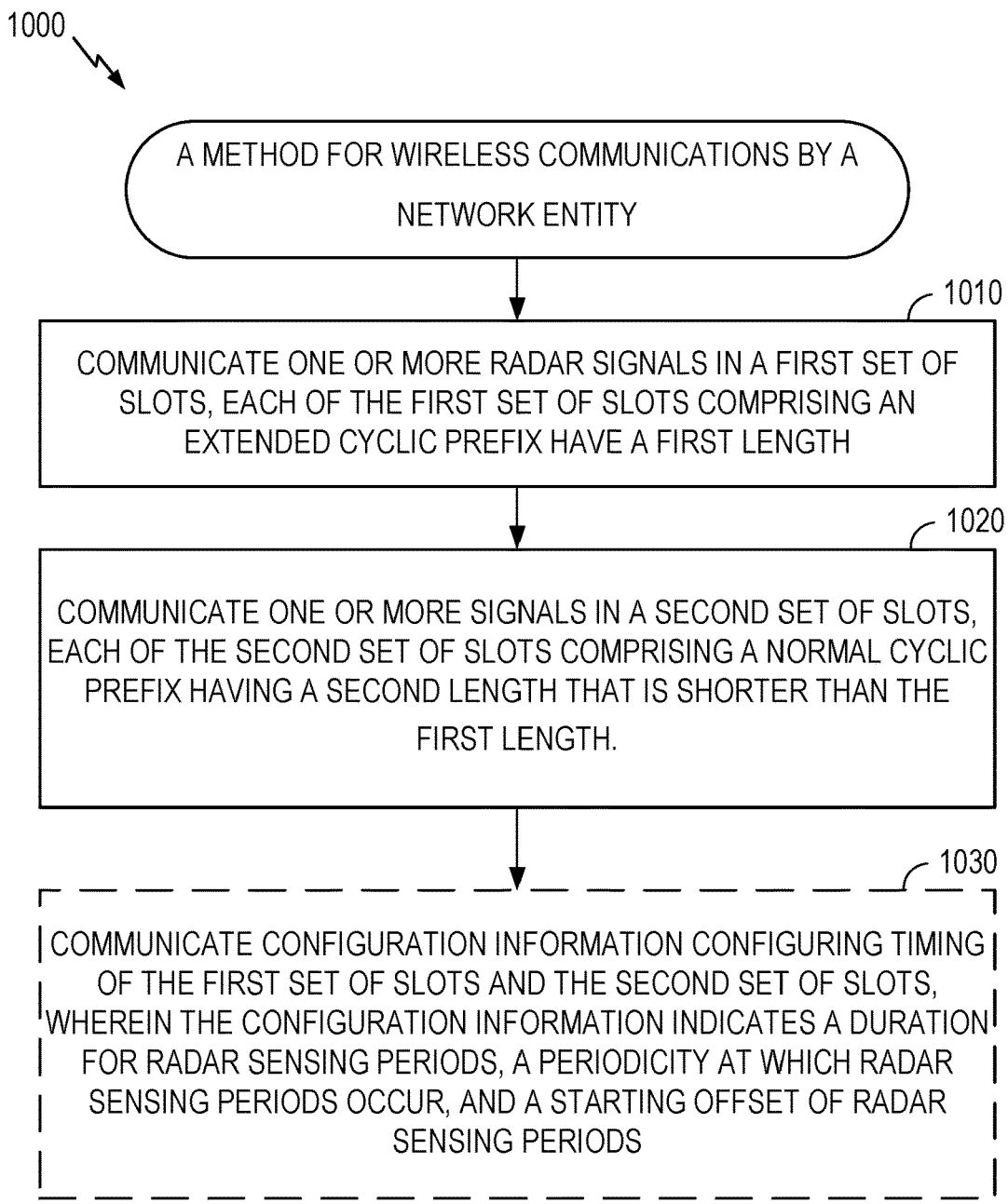
FIG. 10 depicts a method for wireless communications by a radar entity.

FIG. 10 shows a method 1000 for wireless communications by a network entity, such as a BS 102 or a UE 104 of FIGS. 1 and 3, or another network entity such as a dedicated radar server.

Method 1000 begins at step 1010 with communicating one or more radar signals in a first set of slots. Each of the first set of slots comprises an extended cyclic prefix have a first length. The communicating may include outputting, transmitting, obtaining, and/or receiving of radar signals.

Method 1000 then proceeds to step 1020 with communicating one or more signals in a second set of slots, each of the second set of slots comprising a normal cyclic prefix having a second length that is shorter than the first length. In certain aspects, the first network entity refrains from transmitting radar signals in the second set of slots. The communicating may include outputting, transmitting, obtaining, and/or receiving of radar signals.

In one aspect, method 1000 further includes, at step 1030, communicating configuration information configuring timing of the first set of slots and the second set of slots, wherein the configuration information indicates a duration for radar sensing periods, a periodicity at which radar sensing periods occur, and a starting offset of radar sensing periods.

In one aspect, the configuration information further indicates a number of radar sensing instances per radar sensing period and a gap duration between consecutive radar sensing instances.

In one aspect, the configuration information further indicates that each of the first set of slots comprises the extended cyclic prefix having the first length.

In one aspect, the one or more radar signals comprise at least one radar dedicated reference signal.

In one aspect, the one or more radar signals comprise one or more non-radar dedicated reference signals.

In one aspect, the one or more non-radar signal are quasi co-located with the at least one radar dedicated reference signals with respect to Doppler shift, Doppler spread, average delay, and average spread.

In one aspect, the one or more radar signals comprise a plurality of radar signals communicated over a plurality of component carriers. The radar signals on different component carriers are quasi co-located with respect to at least average delay and delay spread.

In one aspect, the network entity is configured to transmit radar signals only in the first set of slots.

Figure 11:
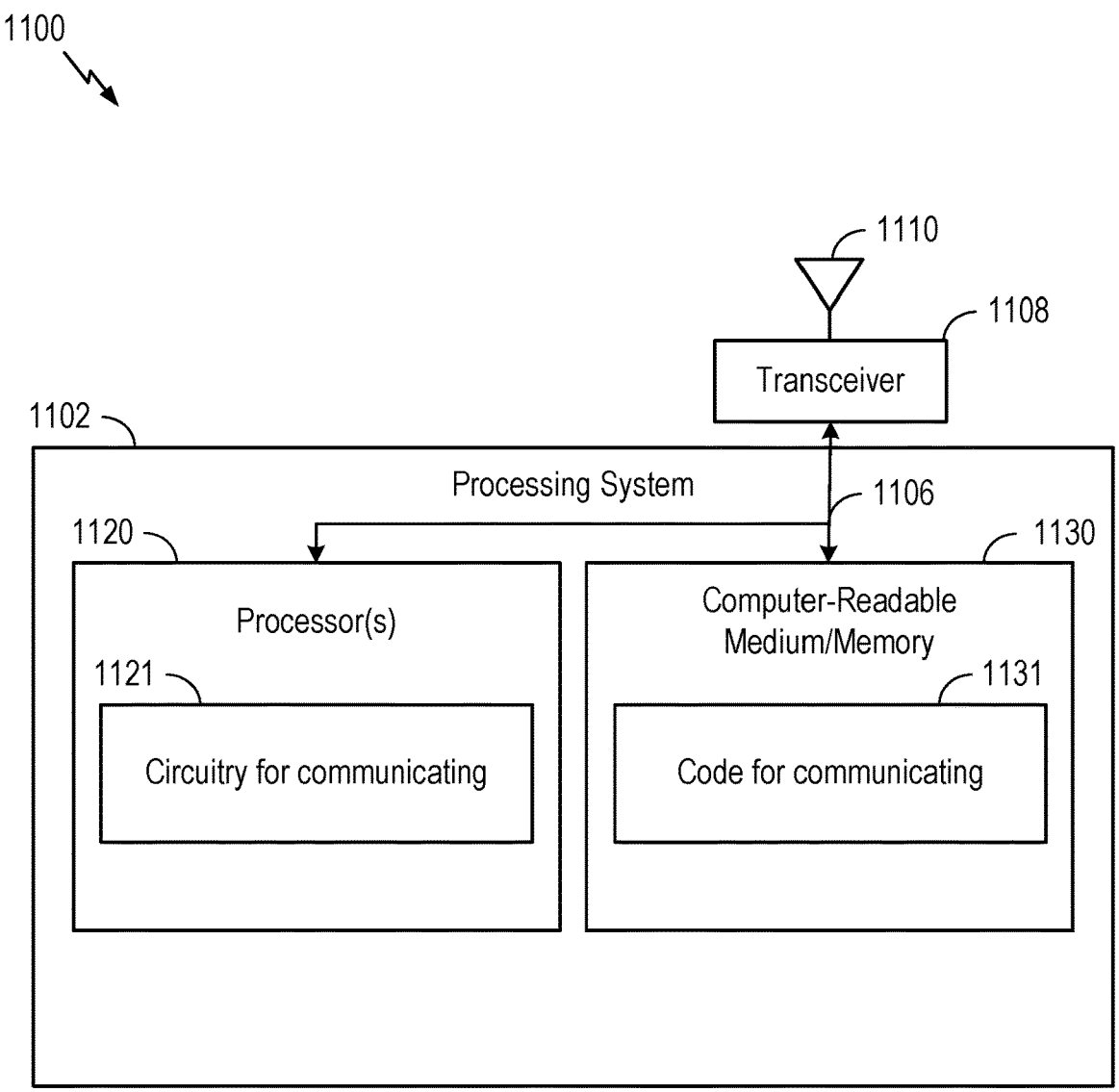
FIG. 11 depicts aspects of an example communications device.

In one aspect, method 1000, or any aspect related to it, may be performed by an apparatus, such as communications device 1100 of FIG. 11, which includes various components operable, configured, or adapted to perform the method 1000. Communications device 1100 is described below in further detail.

Note that FIG. 10 is just one example of a method, and other methods including fewer, additional, or alternative steps are possible consistent with this disclosure.

Example Communications Device

FIG. 11 depicts aspects of an example communications device 1100. In some aspects, communications device 1100 is a radar entity, such as a BS 102 or a UE 104 described above with respect to FIGS. 1 and 3, or another network entity such as a dedicated radar server.

The communications device 1100 includes a processing system 1102 coupled to a transceiver 1108 (e.g., a transmitter and/or a receiver). The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes one or more processors 1120. In various aspects, the one or more processors 1120 may be representative of one or more of receive processor 358, transmit processor 364, TX MIMO processor 366, and/or controller/processor 380, as described with respect to FIG. 3. The one or more processors 1120 are coupled to a computer-readable medium/memory 1130 via a bus 1106. In certain aspects, the computer-readable medium/memory 1130 is configured to store instructions (e.g., computer-executable code) that when executed by the one or more processors 1120, cause the one or more processors 1120 to perform the method 1000 described with respect to FIG. 10, or any aspect related to it. Note that reference to a processor performing a function of communications device 1100 may include one or more processors performing that function of communications device 1100.

In the depicted example, computer-readable medium/memory 1130 stores code 1131 (e.g., executable instructions) for communicating. The code 1131 for communicating may include code for obtaining, code for receiving, code for transmitting, and/or code for outputting. Processing of the code 1131 may cause the communications device 1100 to perform the method 1000 described with respect to FIG. 10, or any aspect related to it.

The one or more processors 1120 include circuitry configured to implement (e.g., execute) the code stored in the computer-readable medium/memory 1130, including circuitry 1121 for communicating. The circuitry 1121 for communicating may include circuitry for obtaining, circuitry for receiving, circuitry for transmitting, and/or circuitry for outputting. Processing with circuitry 1121 may cause the communications device 1100 to perform the method 1000 described with respect to FIG. 10, or any aspect related to it.

Various components of the communications device 1100 may provide means for performing the method 1000 described with respect to FIG. 10, or any aspect related to it.

Example Clauses

Implementation examples are described in the following numbered clauses:

Clause 1: A method for wireless communications by a network entity, the method comprising: communicating one or more radar signals in a first set of slots, each of the first set of slots comprising an extended cyclic prefix have a first length; and communicating one or more signals in a second set of slots, each of the second set of slots comprising a normal cyclic prefix having a second length that is shorter than the first length.

Clause 2: The method of clause 1, further comprising communicating configuration information configuring timing of the first set of slots and the second set of slots, wherein the configuration information indicates a duration for radar sensing periods, a periodicity at which radar sensing periods occur, and a starting offset of radar sensing periods.

Clause 3: The method of clause 2, wherein the configuration information further indicates a number of radar sensing instances per radar sensing period and a gap duration between consecutive radar sensing instances.

Clause 4: The method of any one or more of clauses 2-3, wherein the configuration information further indicates that each of the first set of slots comprises the extended cyclic prefix having the first length.

Clause 5: The method of any one or more of clauses 1-4, wherein the one or more radar signals comprise at least one radar dedicated reference signal.

Clause 6: The method of clause 5, wherein the one or more radar signals comprise one or more non-radar dedicated reference signals.

Clause 7: The method of clause 6, wherein the one or more non-radar dedicated reference signals are quasi co-located with the at least one radar dedicated reference signal with respect to Doppler shift, Doppler spread, average delay, and average spread.

Clause 8: The method of any one or more of clauses 1-7, wherein the one or more radar signals comprise a plurality of radar signals communicated over a plurality of component carriers, and wherein radar signals on different component carriers are quasi co-located with respect to at least average delay and delay spread.

Clause 9: The method of any one or more of clauses 1-8, wherein the network entity is configured to transmit radar signals only in the first set of slots.

Clause 10: An apparatus, comprising: a memory comprising executable instructions; and a processor configured to execute the executable instructions and cause the apparatus to perform a method in accordance with any one of Clauses 1-9.

Clause 11: An apparatus, comprising means for performing a method in accordance with any one of Clauses 1-9.

Clause 12: A non-transitory computer-readable medium comprising executable instructions that, when executed by a processor of an apparatus, cause the apparatus to perform a method in accordance with any one of Clauses 1-9.

Clause 13: A computer program product embodied on a computer-readable storage medium comprising code for performing a method in accordance with any one of Clauses 1-9.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communications by a network entity, the method comprising:
communicating one or more radar signals in a first set of slots, each of the first set of slots comprising an extended cyclic prefix having a first length; and
communicating one or more signals in a second set of slots, each of the second set of slots comprising a normal cyclic prefix having a second length that is shorter than the first length.

2. The method of claim 1, further comprising communicating configuration information configuring timing of the first set of slots and the second set of slots, wherein the configuration information indicates a duration for radar sensing periods, a periodicity at which radar sensing periods occur, and a starting offset of radar sensing periods.

3. The method of claim 2, wherein the configuration information further indicates a number of radar sensing instances per radar sensing period and a gap duration between consecutive radar sensing instances.

4. The method of claim 2, wherein the configuration information further indicates that each of the first set of slots comprises the extended cyclic prefix having the first length.

5. The method of claim 1, wherein the one or more radar signals comprise at least one radar dedicated reference signal.

6. The method of claim 5, wherein the one or more radar signals further comprise one or more non-radar dedicated reference signals.

7. The method of claim 6, wherein the one or more non-radar dedicated reference signals are quasi co-located with the at least one radar dedicated reference signal with respect to Doppler shift, Doppler spread, average delay, and average spread.

8. The method of claim 1, wherein the one or more radar signals comprise a plurality of radar signals communicated over a plurality of component carriers, and wherein radar signals on different component carriers are quasi co-located with respect to at least average delay and delay spread.

9. The method of claim 1, wherein the network entity is configured to transmit radar signals only in the first set of slots.

10. A network entity configured for wireless communications, the network entity comprising:
a memory comprising computer-executable instructions; and
a processor configured to execute the computer-executable instructions and cause the network entity to:
communicate one or more radar signals in a first set of slots, each of the first set of slots comprising an extended cyclic prefix having a first length; and
communicate one or more signals in a second set of slots, each of the second set of slots comprising a normal cyclic prefix having a second length that is shorter than the first length.

11. The network entity of claim 10, wherein the processor is configured to execute the computer-executable instructions and further cause the network entity to:
communicate configuration information configuring timing of the first set of slots and the second set of slots, wherein the configuration information indicates a duration for radar sensing periods, a periodicity at which radar sensing periods occur, and a starting offset of radar sensing periods.

12. The network entity of claim 11, wherein the configuration information further indicates a number of radar sensing instances per radar sensing period and a gap duration between consecutive radar sensing instances.

13. The network entity of claim 11, wherein the configuration information further indicates that each of the first set of slots comprises the extended cyclic prefix having the first length.

14. The network entity of claim 10, wherein the one or more radar signals comprise at least one radar dedicated reference signal.

15. The network entity of claim 14, wherein the one or more radar signals further comprise one or more non-radar dedicated reference signals.

16. The network entity of claim 15, wherein the one or more non-radar dedicated reference signals are quasi co-located with the at least one radar dedicated reference signal with respect to Doppler shift, Doppler spread, average delay, and average spread.

17. The network entity of claim 10, wherein the one or more radar signals comprise a plurality of radar signals communicated over a plurality of component carriers, and wherein radar signals on different component carriers are quasi co-located with respect to at least average delay and delay spread.

18. The network entity of claim 10, wherein the network entity is configured to transmit radar signals only in the first set of slots.

19. A non-transitory computer-readable medium comprising computer-executable instructions that, when executed by a processor of a network entity, cause the network entity to perform a method of wireless communications, the method comprising:
communicate one or more radar signals in a first set of slots, each of the first set of slots comprising an extended cyclic prefix having a first length; and
communicate one or more signals in a second set of slots, each of the second set of slots comprising a normal cyclic prefix having a second length that is shorter than the first length.

20. The non-transitory computer-readable medium of claim 19, wherein the method further comprises communicating configuration information configuring timing of the first set of slots and the second set of slots, wherein the configuration information indicates a duration for radar sensing periods, a periodicity at which radar sensing periods occur, and a starting offset of radar sensing periods.

21. The non-transitory computer-readable medium of claim 20, wherein the configuration information further indicates a number of radar sensing instances per radar sensing period and a gap duration between consecutive radar sensing instances.

22. The non-transitory computer-readable medium of claim 20, wherein the configuration information further indicates that each of the first set of slots comprises the extended cyclic prefix having the first length.

23. The non-transitory computer-readable medium of claim 19, wherein the one or more radar signals comprise at least one radar dedicated reference signal.

24. The non-transitory computer-readable medium of claim 23, wherein the one or more radar signals further comprise one or more non-radar dedicated reference signals.

25. The non-transitory computer-readable medium of claim 24, wherein the one or more non-radar dedicated reference signals are quasi co-located with the at least one radar dedicated reference signal with respect to Doppler shift, Doppler spread, average delay, and average spread.

26. The non-transitory computer-readable medium of claim 19, wherein the one or more radar signals comprise a plurality of radar signals communicated over a plurality of component carriers, and wherein radar signals on different component carriers are quasi co-located with respect to at least average delay and delay spread.

27. The non-transitory computer-readable medium of claim 19, wherein the network entity is configured to transmit radar signals only in the first set of slots.

28. An apparatus for wireless communications, the apparatus comprising:
   means for communicating one or more radar signals in a first set of slots, each of the first set of slots comprising an extended cyclic prefix having a first length; and
   means for communicating one or more signals in a second set of slots, each of the second set of slots comprising a normal cyclic prefix having a second length that is shorter than the first length.

29. The apparatus of claim 28, further comprising:
   means for communicating configuration information configuring timing of the first set of slots and the second set of slots, wherein the configuration information indicates a duration for radar sensing periods, a periodicity at which radar sensing periods occur, and a starting offset of radar sensing periods.

30. The apparatus of claim 29, wherein the configuration information further indicates a number of radar sensing instances per radar sensing period and a gap duration between consecutive radar sensing instances.

* * * * *